(12) United States Patent  (10) Patent No.: US 7,588,261 B2
Kawanobe et al.  (45) Date of Patent: Sep. 15, 2009

(54) SUSPENSION DEVICE

(75) Inventors: Yoshinori Kawanobe, Fujisawa (JP); Masahiko Nishida, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 412 days.

(21) Appl. No.: 11/508,564

(22) Filed: Aug. 23, 2006

(65) Prior Publication Data

US 2007/0052192 A1  Mar. 8, 2007

(30) Foreign Application Priority Data

Aug. 25, 2005  (JP)  ............................. 2005-244494

(51) Int. Cl.
  *B60G 3/12*  (2006.01)
(52) U.S. Cl. .................. 280/124.128; 280/124.116
(58) Field of Classification Search .......... 280/124.116, 280/124.128, 124.125, 124.153, 93.512, 280/86.75
  See application file for complete search history.

(56) References Cited

U.S. PATENT DOCUMENTS

| 4,526,400 | A | | 7/1985 | Kijima et al. |
| 4,815,755 | A | * | 3/1989 | Takata et al. ........... 280/124.128 |
| 5,685,556 | A | | 11/1997 | Shibue et al. |
| 7,431,315 | B2 | * | 10/2008 | Jargowsky et al. .... 280/124.128 |
| 2005/0275183 | A1 | * | 12/2005 | Amano ................. 280/124.128 |
| 2006/0082094 | A1 | * | 4/2006 | Mosler ................. 280/124.116 |

FOREIGN PATENT DOCUMENTS

| DE | 2311480 | | 9/1974 |
| DE | 10321877 | * | 4/2005 |
| EP | 302226 A2 | * | 2/1989 |
| EP | 1405740 A1 | | 4/2004 |
| FR | 2525969 | | 11/1983 |
| JP | 58097508 A | * | 6/1983 |
| JP | 59014510 A | * | 1/1984 |
| JP | 2000-25438 A | | 1/2000 |
| JP | 2002-12015 A | | 1/2002 |
| JP | 2004-224064 A | | 8/2004 |
| JP | 2005-119601 | | 5/2005 |
| JP | 2005-119601 A | | 5/2005 |

\* cited by examiner

*Primary Examiner*—Paul N Dickson
*Assistant Examiner*—Nicole Verley
(74) *Attorney, Agent, or Firm*—Global IP Counselors, LLP (57) ABSTRACT

An axle that rotatably supports a wheel is elastically coupled to trailing arms of a motor vehicle via an upper connecting point and first and second lower connecting points, where the trailing arms are elastically coupled to a body of the vehicle. The first and second lower connecting points are positioned lower than the upper connecting point and are mutually arranged to open a gap in a front-to-rear direction of the vehicle. The first and second lower connecting points have elastic members and are arranged so that principal elastic axes of their respective elastic members intersect at a location that is outside, in the lateral direction of the vehicle, of a grounding point of the wheel. In this manner, the running stability can be increased without relying on the rigidity of the elastic members, resulting in increased freedom in design of the elastic members.

18 Claims, 8 Drawing Sheets

Moment

To the front of the front to rear direction of the vehicle
←

FIG. 7

To the outside of the lateral direction of the vehicle
←

FIG. 8

To the front of the front to rear direction of the vehicle

FIG. 9

To the front of the front to rear direction of the vehicle

SUSPENSION DEVICE

CROSS-REFERENCE

The present application claims priority under 35 U.S.C. §119 of Japanese Patent Application No. 2005-244494, filed on Aug. 25, 2005, the entire content of which is expressly incorporated by reference herein.

FIELD

The present invention relates to a torsion beam suspension device.

BACKGROUND

An example of a conventional suspension device is the suspension device described in Japanese Laid Open Patent Publication 2005-119601. For this device, left and right trailing arms are connected by a torsion beam so as to form an H-shape, and the axle is elastically supported by each trailing arm. Such elastic support has at least two elastic members placed in the front and in the rear so as to interpose the rotational axis of the wheel. The elastic force of the front elastic member is set to be lower than the elastic force of the rear elastic member. In this manner, a toe change to the toe-in direction is made to occur when the vehicle turns.

However, with the conventional device, in addition to limitations in the placement location of the elastic members, which requires placement in the front and in the rear of the axle, a relationship for the degree of elasticity must be fixed between the two elastic members placed in the front and in the rear of the axle. Therefore, there is a problem in the restriction of the placement location and the selection of the rigidity of the elastic members when considering other performance required of the elastic members, such as the reduction of noise, vibration, and the like.

SUMMARY

Embodiments of the present invention provide a suspension device that enables improvement in running stability while increasing freedom in placement location and rigidity of each elastic member.

In order to resolve the aforementioned problems, the suspension device of the present invention has trailing arms, extending in the front-to-rear direction of the vehicle that are elastically supported to the vehicle body by their front ends, and an axle for supporting the wheel so that it can rotate freely. The axle is elastically supported at a plurality of connecting points by the trailing arms. The connecting points have an upper connecting point and first and second lower connecting points positioned lower than the upper connecting point and mutually placed so as to open a gap in the front-to-rear direction of the vehicle, and both of the principal elastic axes of each of the elastic members placed at the first and second lower connecting points intersect more to the outside of the lateral direction of the vehicle than the grounding point of the wheel.

According to the present invention, the running stability can be improved as well as the freedom in design of the elastic members without depending on the rigidity of the elastic members.

DETAILED DESCRIPTION

Next is provided a detailed explanation of an embodiment of the present invention with reference to the drawings.

Figure 1:
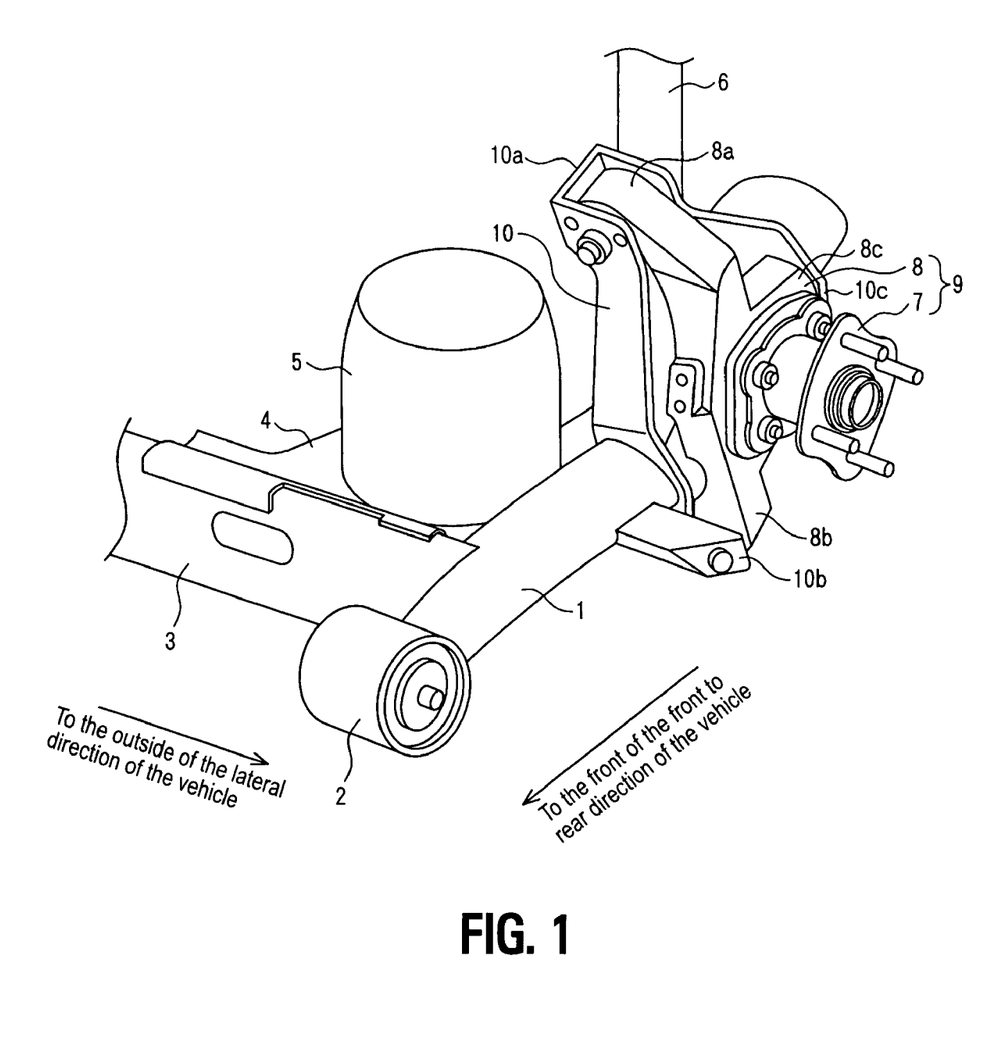
FIG. 1 is a perspective view of a suspension composition, according to an embodiment of the invention.
Figure 2:
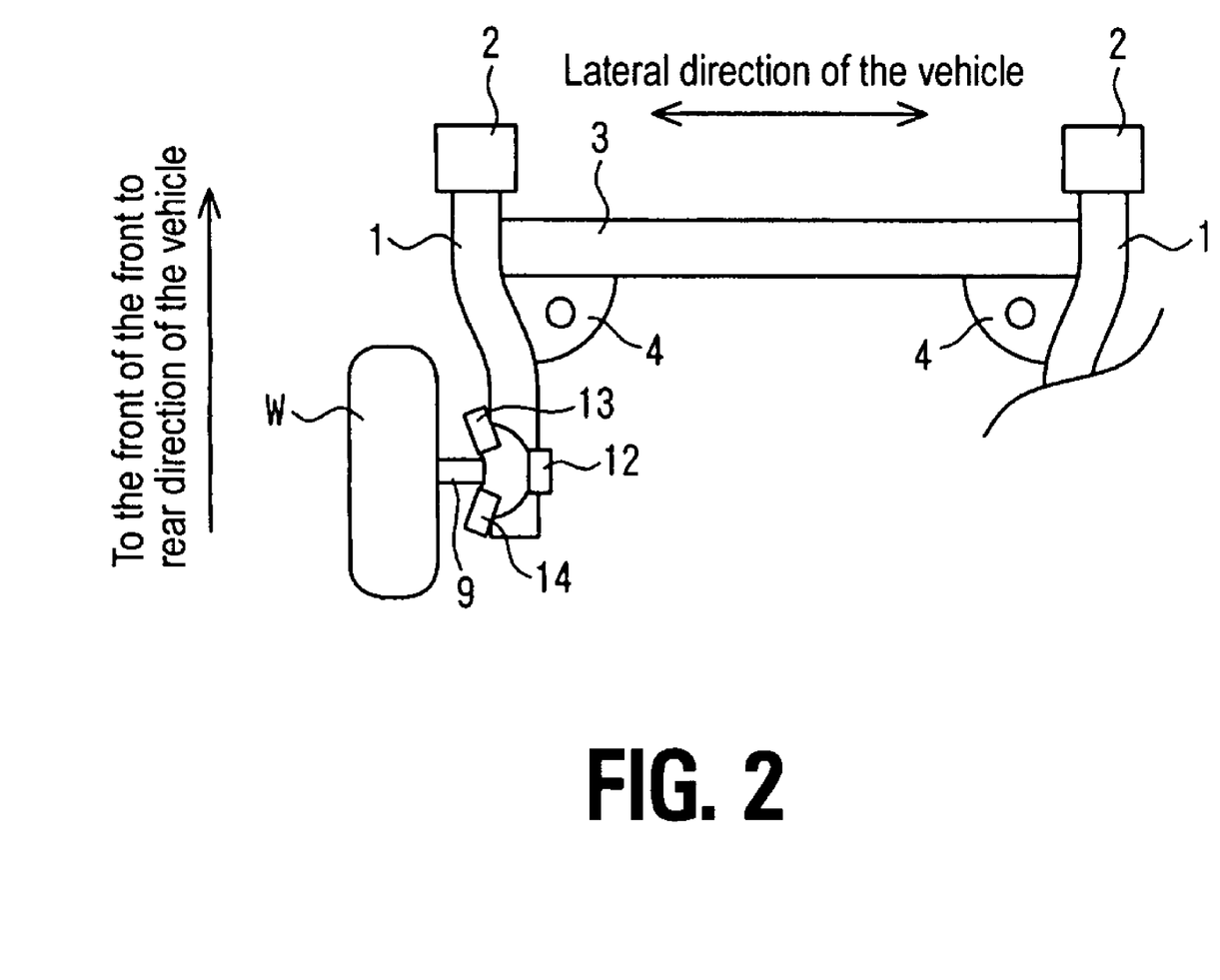
FIG. 2 is a plane view of a suspension composition, according to another embodiment of the invention.

Beginning with a description of the composition, as shown in FIG. 1 and FIG. 2, right and left trailing arms 1 each extend in the front-to-rear direction of a motor vehicle and are linked to the vehicle body at their front ends via bushings 2 so as to allow trailing arms 1 to swing up and down. Left and right trailing arms 1 are linked by means of torsion beam 3. In FIG. 1, reference numeral 4 is a reinforcing plate on which the lower end of suspension spring 5 rests. In addition, reference numeral 6 is the shock absorber. Axle 9 rotatably supports a wheel W and is elastically supported to the rear of each of trailing arms 1.

A support structure of axle 9 includes an axle bracket 10 that is fixed to the rear of trailing arm 1. Bracket 10 is approximately triangular in shape when viewed from the side and has an upper attachment 10a, extending upwards, formed at the top thereof and left and right attachments 10b and 10c arranged by opening a gap in the front-to-rear direction of the vehicle along trailing arm 1. Each of the attachments 10a, 10b, and 10c are made from U-shaped members and are equipped with a pair of attachment plates that face the front-to-rear-direction of the vehicle so as to allow for attachment of the bushings. The position of the upper attachment is the upper connecting point and the position of the left and right attachments, which are further below the upper connecting point, are the first and second lower connecting points. In addition, axle 9 comprises axle body 7, which supports the axle so that it can rotate freely, and axle housing 8 which is integrated with axle body 7 to form a single unit and has three arm units 8a-8c that respectively extend toward the three connecting points.

Figure 3A:
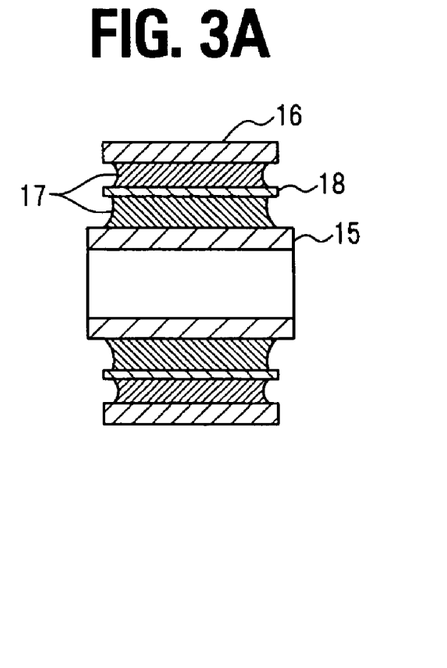
FIG. 3 is a drawing showing a bushing, according to another embodiment of the invention.
Figure 3B:
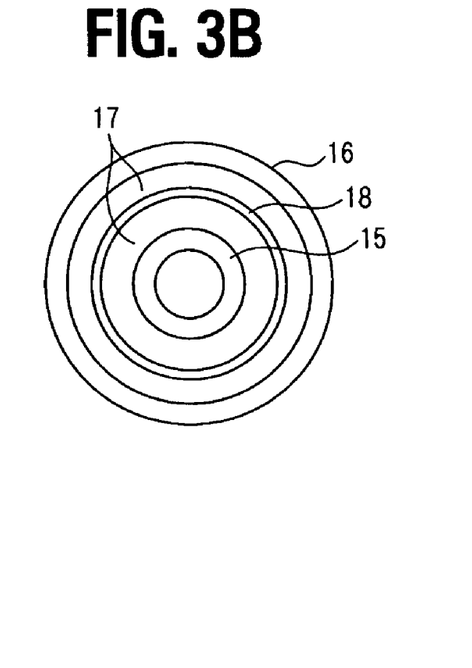

Bushings 12-14 are provided on the ends of each of arm units 8a-8c. As shown in FIG. 3, each of bushings 12-14 are configured so that elastic bodies 17 are inserted between concentrically placed inner cylinders 15 and outer cylinders 16, and each of outer cylinders 16 are integrally fixed to the end of the arm units. Each of the bushings 12-14 are disposed between the attachment plates placed at each connecting point, and inner cylinders 15 are attached and secured to the pair of attachment plates by a bolt that runs through inner cylinders 15. The bushing at the upper connecting point is a first bushing 12, and the two bushings placed at the lower connecting points are second bushing 13 and third bushing 14.

Figure 4:
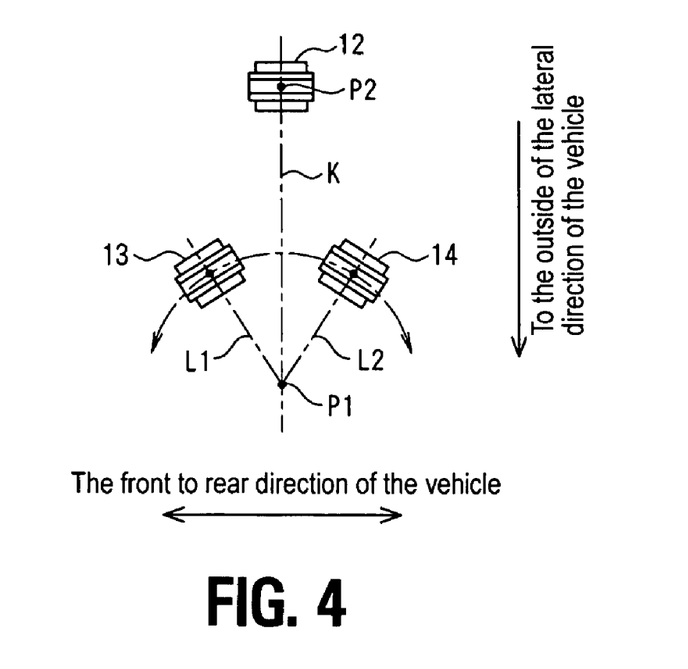
FIG. 4 is a plane view showing a positional relationship of three bushings, according to another embodiment of the invention.

For one embodiment, the three bushings 12-14 are arranged as shown in FIG. 4, when viewed on a plane surface. In other words, the first bushing 12 is placed further to the inside, in the lateral direction of the vehicle, than the second bushing 13 and the third bushing 14, with its axis facing the front-to-rear direction of the vehicle. Moreover, the axis of the first bushing 12 is arranged so as to intersect with a virtual kingpin axis K, to be described hereinafter. Arranging the first bushing 12 so as to intersect with virtual kingpin axis K acts to make torsional deformation of the first bushing 12 uniform at the time of steering.

The axes of the second bushing 13 and the third bushing 14, as viewed on a plane surface, are placed so as to extend in the front-to-rear direction of the vehicle tilted toward the lateral direction of the vehicle in relation to the axis line of the front-to-rear direction of the vehicle; and the axes lines of both of the bushings 13 and 14 are placed so as to intersect more to the inside of the front-to-rear direction of the vehicle than the position of the bushings 13 and 14. In this manner, axes lines L1 and L2 that are in a direction perpendicular to the axes of both the bushings 13 and 14 and that form the principal elastic axes facing the lateral direction of the vehicle intersect more to the outside of the lateral direction of the vehicle than the position of both bushings 13 and 14. P1 is the intersection point thereof.

Furthermore, for at least the second bushing 13 and the third bushing 14, as shown in FIG. 3, cylindrically-shaped intermediate plate 18 is concentrically arranged inside of elastic bodies 17 placed between inner cylinder 15 and outer cylinder 16 so as to increase the rigidity in the direction perpendicular to the axis (the lateral direction of the vehicle). Moreover, a plate that has a higher degree of rigidity than elastic bodies 17 is used for intermediate plate 18. Furthermore, as long as intermediate plate 18 is positioned to face the lateral direction of the vehicle, it does not need to be positioned around the entire circumference and a high lateral rigidity can be set. For the present embodiment, by providing intermediate plate 18 and setting the spring force ratio at 100 times or more in the direction perpendicular to the axis versus the axial direction, the rigidity in the direction perpendicular to the axis, or the lateral direction of the vehicle, is increased, the rigidity in the axial direction is decreased, and inner cylinder 15 and outer cylinder 16 can be made to swing more easily relative to the axial direction.

Figure 5:
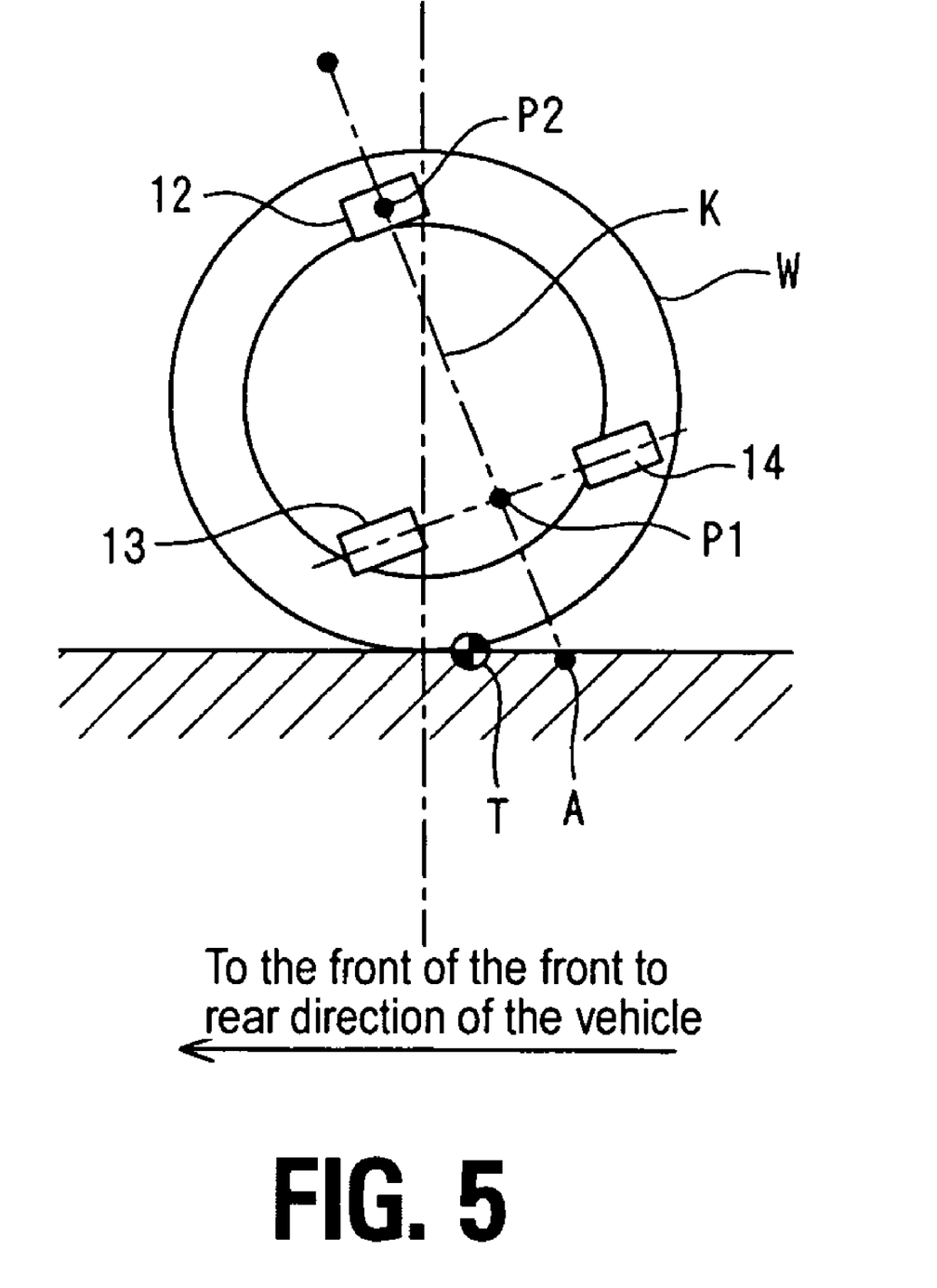
FIG. 5 is a side view showing a positional relationship of three bushings, according to another embodiment of the invention.

Furthermore, by setting the mutual point of intersection PI for the principal elastic axes L1 and L2 of the second and third bushings 13 and 14 that face the lateral direction of the vehicle, as described above, the virtual kingpin axis K is formed by the direct line connecting intersection point P1 and the elastic center P2 of the first bushing 12 in relation to the lateral force F1 acting on the wheel W. In addition, for the present embodiment, as shown in FIG. 4 and FIG. 5, the intersection point A between the ground and the virtual kingpin axis K is set by adjusting the position of the first bushing 12 and the position of the intersection point P1 so as to be more to the outside of the lateral direction of the vehicle and more to the rear of the front-to-rear direction of the vehicle than the tire grounding point T.

Regarding intersection point P1 that regulates the virtual kingpin axis K, as shown in FIG. 4, for example, when the target position is P1, the point of intersection between the principal elastic axes L1 and L2 for second bushing 13 and third bushing 14 passes through P1, making the distance between P1 and second bushing 13 and third bushing 14 equal, and it is preferable to arrange each of the axes of second bushing 13 and third bushing 14 so that second bushing 13 and third bushing 14 are positioned on the virtual circle R that is the center of P1. By arranging the axes in such a manner, the steering of the wheel W can be done smoothly around the virtual kingpin axis K. In this manner, the degree of freedom in placement of second bushing 13 and third bushing 14 is increased. So, for example, second bushing 13 and third bushing 14 can also be placed to the rear of the axle. In addition, virtual circle R does not need to be on a horizontal plane, but may also be on a plane surface that is tilted in the vertical direction, as viewed from the side in relation to a horizontal plane. However, it is preferable to place virtual circle R on a flat plane that intersects with the virtual kingpin axis K.

The structure of second bushing 13 and third bushing 14 is as shown in FIG. 3, and when the elastic bodies 17 are homogeneous in the axial direction of the concentrically placed outer cylinder 16 and inner cylinder 15, the principal elastic axes L1 and L2 of second bushing 13 and third bushing 14 face a perpendicular direction to the axis of the outer cylinder and the inner cylinder of both second bushing 13 and third bushing 14. For the structure of second bushing 13 and third bushing 14 in which elastic bodies 17 are not homogeneous in the axial direction of the concentrically placed outer cylinder 16 and inner cylinder 15, for example, a structure whereby intermediate plate 18 is equipped for only a portion of the axial direction, or a structure in which a void is provided to a portion of the axial direction, principal elastic axes L1 and L2 are placed in a position that is offset from the direction perpendicular to the axis of the outer cylinder and the inner cylinder of both second bushing 13 and third bushing 14, but there is still a great deal of freedom in placement of second bushing 13 and third bushing 14 as long as the principal elastic axes L1 and L2 are placed so as to be in the P1 position.

Figure 6:
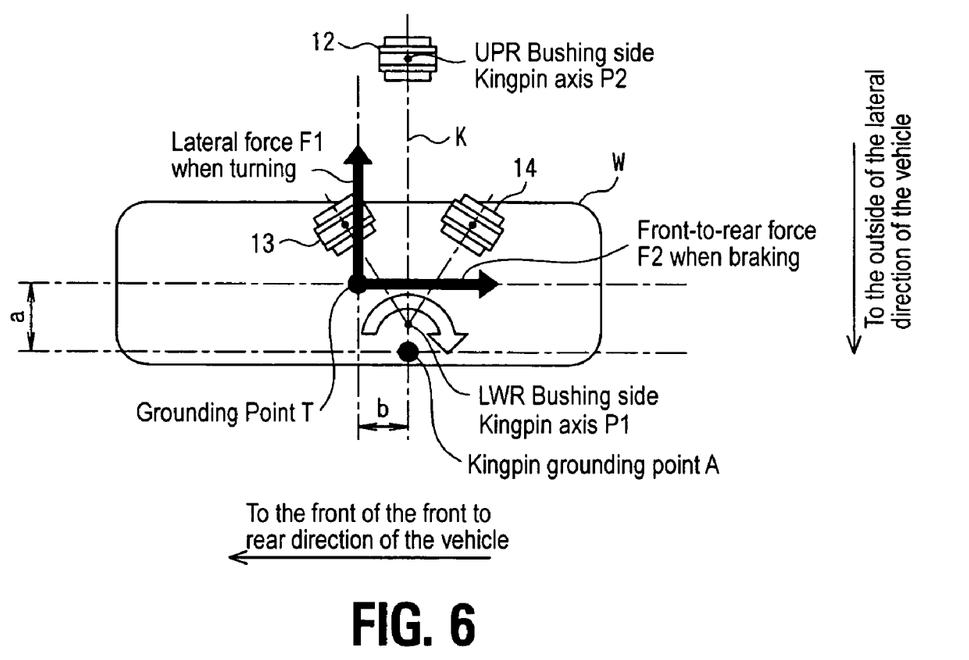
FIG. 6 is a plane view showing a positional relationship of three bushings and a relationship of an input force, according to another embodiment of the invention.
Figure 7:
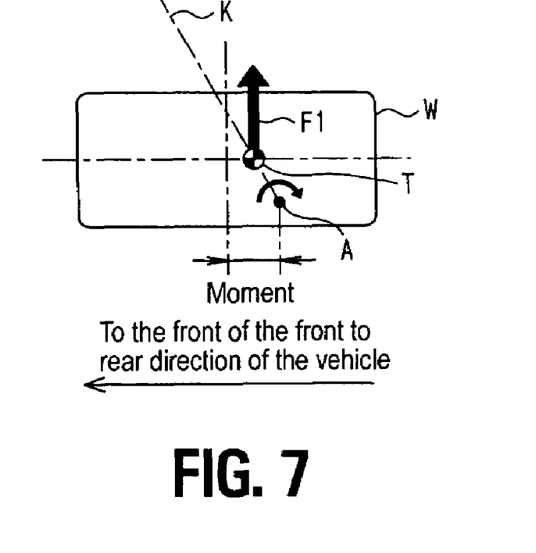
FIG. 7 is a plane view used to explain a lateral force at the time of input, according to another embodiment of the invention.

Next is provided a description of the operation and effect of the suspension device with the aforementioned composition. When a lateral force F1 is applied to the tire by the turning of the vehicle, as shown in FIG. 6, the wheel W is steered by the torque around the kingpin axis K due to the fact that grounding point A of the virtual kingpin axis K is more to the rear than tire grounding point T, as shown in FIG. 7; and by such steering, a small amount of rotation is applied in the toe-in direction at the outside turning wheel, while a small amount of rotation is applied in the toe-out direction of the inside turning wheel. Meanwhile, although a toe change occurs in the toe-out direction for the outside turning wheel and a toe change occurs in the toe-in direction for the inside turning wheel from compliance steering due to bushings 2 equipped at the front ends of trailing arms 1, because the direction of this toe change is in the opposite direction as the toe change due to the elastic support structure of axle 9, depending on the elastic support structure of axle 9, the effect caused by the aforementioned compliance steering can be reduced or cancelled, thereby improving running stability at the time of turning.

Figure 8:
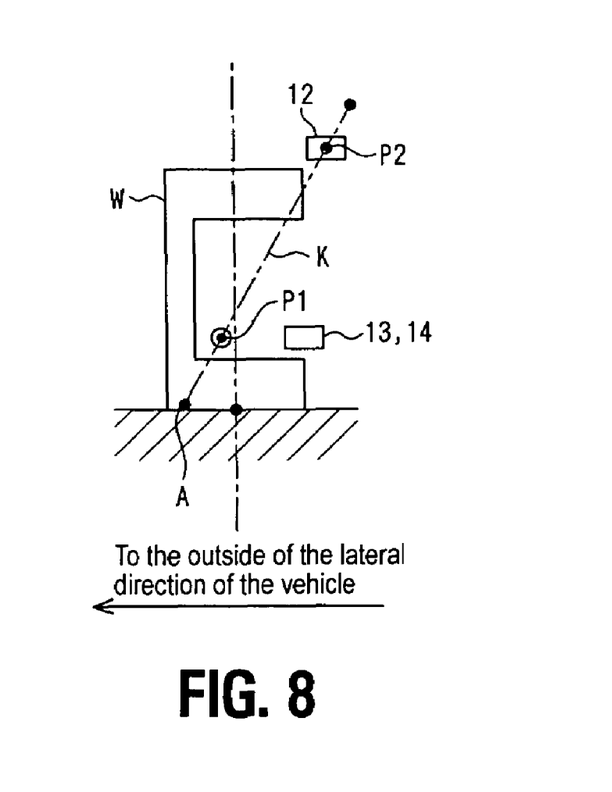
FIG. 8 is a drawing viewed from a front-to-rear direction of a vehicle showing a relationship between a wheel and a virtual kingpin axis, according to another embodiment of the invention.

At this point, second bushing 13 and third bushing 14 are positioned more to the inside of the lateral direction of the vehicle than the wheel W, and, as described above, kingpin axis K, which is the turning center that is more to the outside of the lateral direction of the vehicle (for example inside of wheel W) than the axle support position inside of wheel W, can be set by regulating the virtual kingpin axis K by positioning intersection point P1 of the principal elastic axes of second bushing 13 and third bushing 14 on the outside of the lateral direction of the vehicle (FIG. 8). Here, two bushings can be used for first bushing 12 that regulates the portion above the virtual kingpin axis K to set a position P2 above the virtual kingpin axis K at the intersection point of the mutual principal elastic axes of the bushings that extend in the lateral direction. Moreover, since the position above virtual kingpin axis K can be positioned more to the inside than the wheel W, it does not need to be regulated as strictly as the position below virtual kingpin axis K. Therefore, there is normally not a problem, even when regulating the position above virtual kingpin axis K by the first bushing 12 itself. In addition, the closer first bushing 12 is placed to the front of the front-to-rear direction of the vehicle, the more kingpin axis K tilts to the front, and even if the position of the intersection point P1 is the same for second bushing 13 and third bushing 14, the grounding point A at which virtual kingpin axis K comes into contact with the ground can be moved to the rear of the front-to-rear direction of the vehicle.

Figure 9:
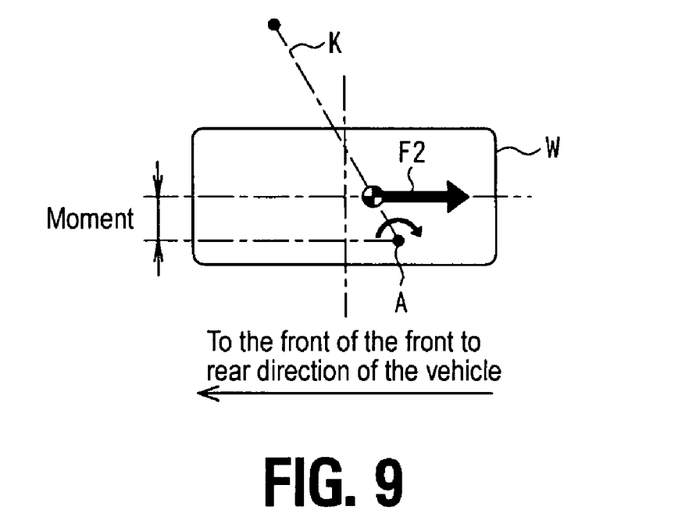
FIG. 9 is a plane view showing a relationship between a kingpin axis at the time of braking and a front-to-rear force, according to another embodiment of the invention.

In addition, since axle 9 is elastically supported by trailing arms 1, the vibration that is transferred to trailing arms 1 from the wheel W can be reduced. For each of the bushings 12-14, in the present embodiment, more specifically in regard to second bushing 13 and third bushing 14 that mainly absorb the load of the lateral force F1 by being placed in proximity to the wheel, since the rigidity in the direction perpendicular to the axis in relation to the lateral direction is significantly increased, a high camber rigidity can be set even with a constitution in which axle 9 is elastically supported. When the vehicle is moving forward and the brakes are applied, although the front-to-rear force F2 is applied to the tire grounding point, as shown in FIG. 9, the wheel W undergoes a change in the toe-in direction due to the steering around the kingpin axis K because the grounding point A of the virtual kingpin axis K is placed more to the outside in the lateral direction of the vehicle than the tire grounding point T, resulting in improved running stability.

Figure 10:
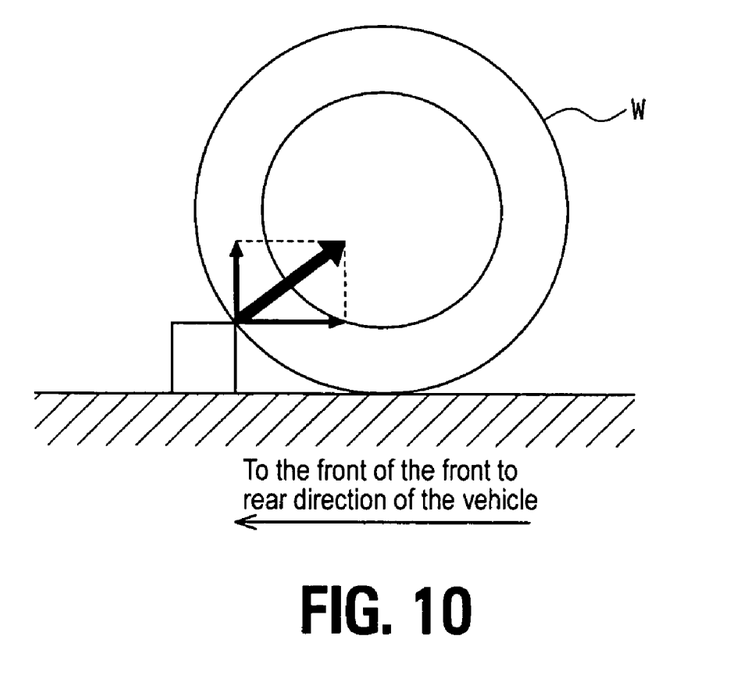
FIG. 10 is a side view showing an input force when riding over a protrusion, according to another embodiment of the invention.
Figure 11:
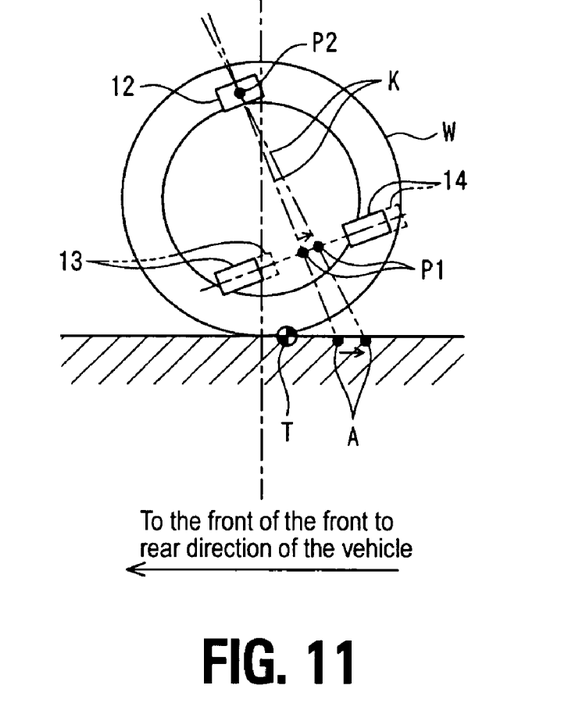
FIG. 11 is a side view used to explain the operation when riding over a protrusion, according to another embodiment of the invention.
Figure 12:
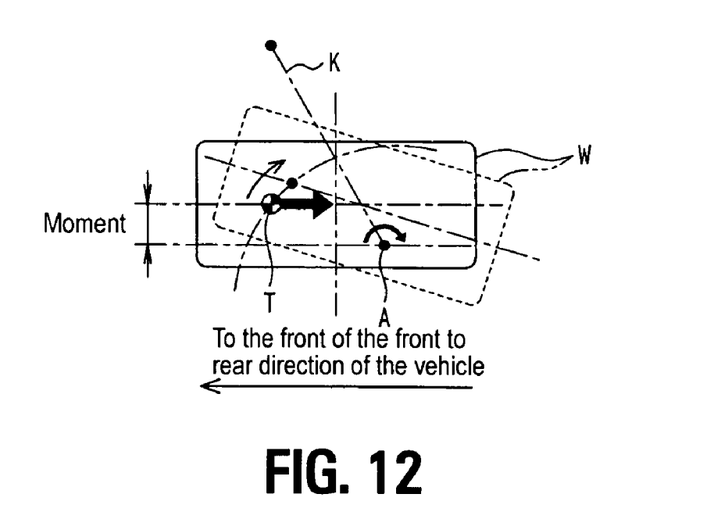
FIG. 12 is a plane view used to explain the operation when riding over a protrusion, according to another embodiment of the invention.

In addition, for the present embodiment, because second bushing 13 and third bushing 14 set the rigidity (front-to-rear rigidity) of the axial direction (front-to-rear direction of the vehicle) to be low in relation to the direction perpendicular to the axis, inner cylinder 15 is relatively easily displaced in relation to outer cylinder 16. Therefore, as shown in FIG. 10, when a front-to-rear force at the rear in the front-to-rear direction of the vehicle is applied to the wheel center when riding over a protrusion, as shown in FIG. 11, second bushing 13 and third bushing 14 swing to the rear in the front-to-rear direction of the vehicle along the axis and intersection point P1 gets displaced, causing the wheel center trajectory of the suspension stroke to get displaced to the rear, thereby reducing the harshness of riding over a protrusion. When this takes place, a moment, such as that shown in FIG. 12, is applied, causing wheel W to turn and get displaced in the toe-in direction, resulting in a favorable running stability when riding over a protrusion.

As described above, since virtual kingpin axis K (the rotational axis in which the tire rotates when an input from the ground is applied to the tire grounding point) can be set to an arbitrary position by plurality of bushings 12-14 that provide elastic support, intersection point A at which kingpin axis K comes into contact with the ground, as viewed from a plane surface, can be arranged in an arbitrary position in the front-to-rear direction of the vehicle in relation to the tire grounding point. Therefore, when a force F1 in the lateral direction of the vehicle is input from the ground to the tire grounding point T when the vehicle is turning, the position of the tire (toe direction displacement), as viewed from above the vehicle, can be controlled, thus allowing for an improvement in the running stability performance.

In addition, since there is no need to fix the positional relationship between the axle and the bushings 12-14, or the elastic support members, or to establish a relative relationship of rigidity between the bushings 12-14, the degree of freedom in design is increased, thus enabling easy adoption. For example, when all of the bushings must be either to the front or rear of the vehicle in relation to the axle, or when a relationship must be maintained for the degree of elasticity of the bushings arranged at both the front and rear directions of the vehicle, from the standpoint of the optimal placement of bushings 12-14 or their characteristics in terms of noise and vibration performance, a technical concept that requires that the elastic bodies, or in other words, the bushings, always be placed to the front and rear of the axle, as is the case with the conventional technology, or that regulates the degree of elasticity between the two bushings placed at the front and rear of the axle cannot be achieved while at the same time attempting to design the device to satisfy other performance criteria, such as noise and vibration.

What is claimed is:

1. A suspension device comprising:
a trailing arm that extends in a front-to-rear direction of a vehicle and that is connected to a body of the vehicle by its front end and an axle that rotatably supports a wheel of the vehicle, the trailing arm elastically supporting the axle via an upper connecting point and first and second lower connecting points, the first and second lower connecting points being positioned lower than the upper connecting point and mutually spaced apart in the front-to-rear direction of the vehicle, the upper connecting point being positioned inside of the first and second lower connecting points in a vehicle width direction of the vehicle; and
an cylindrical elastic member placed at each of the upper connecting point and the first and second lower connecting points, each elastic member having a central axis and a principal elastic axis that extends perpendicular to the central axis and passes through a geometric center of the elastic member, the central axes of the elastic members placed at the first and second lower connecting points intersecting at an inside location inside of the first and second lower connecting points in the vehicle width direction of the vehicle, the principal elastic axes of the elastic members placed at the first and second lower connecting points intersecting at an outside location outside of the first and second lower connecting points in the vehicle width direction of the vehicle, a kingpin axis connecting the upper connecting point to the outside location intersecting with the ground at a kingpin grounding point which lies outside and to a rear of a grounding point of the wheel.

2. The suspension device of claim 1, wherein
the principal elastic axes of the elastic members placed at the first and second lower connecting points intersecting at the outside location outside of the grounding point of the wheel in the vehicle width direction of the vehicle.

3. The suspension device of claim 2, wherein
the elastic members of the first and second lower connecting points are bushings in which elastic bodies are mounted between an inner cylinder and an outer cylinder.

4. The suspension device in claim 3, wherein
each bushing comprises a plate, having a higher rigidity than the elastic bodies of that bushing, is inserted in a position that intersects the principal elastic axis corresponding to that bushing and that faces at least one of the elastic bodies placed between the inner cylinder and outer cylinder.

5. The suspension device of claim 2, wherein
a rigidity of each elastic member placed at the first and second lower connecting points in the vehicle width direction of the vehicle is higher than a rigidity of each elastic member placed at the first and second lower connecting points in the front-to-rear direction of the vehicle.

6. The suspension device of claim 1, wherein
the principal elastic axes of the elastic members placed at the first and second lower connecting points intersecting at the outside location that is to a rear of the grounding point of the wheel in the front-to-rear direction of the vehicle.

7. The suspension device of claim 6, wherein
the elastic members of the first and second lower connecting points are bushings in which elastic bodies are mounted between an inner cylinder and an outer cylinder.

8. The suspension device in claim 7, wherein
each bushing comprises a plate, having a higher rigidity than the elastic bodies of that bushing, is inserted in a position that intersects the principal elastic axis corresponding to that bushing and that faces at least one of the elastic bodies placed between the inner cylinder and outer cylinder.

9. The suspension device of claim 6, wherein
a rigidity of each elastic member placed at the first and second lower connecting points in the vehicle width direction of the vehicle is higher than a rigidity of each elastic member placed at the first and second lower connecting points in the front-to-rear direction of the vehicle.

10. The suspension device of claim 1, wherein
the elastic members of the first and second lower connecting points are bushings in which elastic bodies are mounted between an inner cylinder and an outer cylinder.

11. The suspension device in claim 10, wherein
each bushing comprises a plate, having a higher rigidity than the elastic bodies of that bushing, is inserted in a position that intersects the principal elastic axis corresponding to that bushing and that faces at least one of the elastic bodies placed between the inner cylinder and outer cylinder.

12. The suspension device of claim 1, wherein
a rigidity of each elastic member placed at the first and second lower connecting points in the vehicle width direction of the vehicle is higher than a rigidity of each elastic member placed at the first and second lower connecting points in the front-to-rear direction of the vehicle.

13. A method of coupling an axle that rotatably supports a wheel to an arm movably coupled to a motor vehicle, comprising:
forming an elastic coupling between the axle and the arm at each of first, second, and third coupling locations with each elastic coupling having a central axis and a principal elastic axis that extends perpendicular to the central axis and passes through a geometric center of the elastic coupling; and
positioning the first and second coupling locations lower than the third coupling location and mutually spaced apart in a front-to-rear direction of the vehicle, the third coupling location being positioned inside of the first and second coupling locations in a vehicle width direction of the vehicle, the central axes of the elastic couplings at the first and second coupling locations intersecting at an inside location inside of the first and second coupling locations in the vehicle width direction of the vehicle, the principal elastic axes of the elastic couplings at the first and second coupling locations intersecting at an outside location outside of the first and second coupling locations in the vehicle width direction of the vehicle, a kingpin axis connecting the third coupling location to the outside location intersecting with the ground at a kingpin grounding point which lies outside and to a rear of a grounding point of the wheel.

14. The method of claim 13, wherein
the forming of the elastic coupling between the axle and the arm at each of the first, second, and third coupling locations includes disposing a bushing between the axle and the arm at each of the first, second and third coupling locations.

15. The method of claim 14, wherein
each bushing comprises an elastic region between an inner cylinder and an outer cylinder.

16. The method of claim 15, wherein
the elastic region comprises first and second elastic bodies with a plate interposed therebetween, the plate having a higher rigidity than the first and second elastic bodies.

17. The method of claim 16, wherein
a rigidity of the elastic region in a direction of the principal elastic axis of the elastic coupling at the coupling location where the bushing with the plate is disposed is higher than a rigidity of the elastic region in a direction of the central axis of the elastic coupling.

18. A suspension device, comprising:
wheel supporting means for rotatably supporting a wheel of a vehicle;
movable coupling means for movably coupling the wheel supporting means to the vehicle; and
elastic coupling means for elastically coupling the wheel supporting means to the movable coupling means at each of an upper connecting point and first and second lower connecting points, the first and second lower connecting points being positioned lower than the upper connecting point and mutually spaced apart in a front-to-rear direction of the vehicle, the upper connecting point being positioned inside of the first and second lower connecting points in a vehicle width direction of the vehicle, each elastic coupling means having a central axis and a principal elastic axis that extends perpendicular to the central axis and passes through a geometric center of the elastic coupling means, the central axes of the elastic coupling means at the first and second lower connecting points intersecting at an inside location inside of the first and second lower connecting points in the vehicle width direction of the vehicle, the principal elastic axes of the elastic coupling means at the first and second lower connecting points intersecting at an outside location outside of the first and second lower connecting points in the vehicle width direction of the vehicle, a kingpin axis connecting the upper connecting point to the outside location intersecting with the around at a kingpin grounding point which lies outside and to a rear of a grounding point of the wheel.

* * * * *